(12) United States Patent
Mayor et al.

(10) Patent No.: US 9,408,178 B2
(45) Date of Patent: Aug. 2, 2016

(54) DETECTING MOBILE ACCESS POINTS

(71) Applicant: Apple Inc., Cupertino, CA (US)

(72) Inventors: Robert Mayor, Half Moon Bay, CA (US); Ronald Keryuan Huang, San Jose, CA (US); Yefim Grosman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 13/746,990

(22) Filed: Jan. 22, 2013

(65) Prior Publication Data

US 2014/0206379 A1 Jul. 24, 2014

(51) Int. Cl.
*H04W 88/08* (2009.01)
*H04W 64/00* (2009.01)

(52) U.S. Cl.
CPC .......... *H04W 64/003* (2013.01); *H04W 64/006* (2013.01)

(58) Field of Classification Search
CPC ..... H04W 84/12; H04W 88/08; H04W 24/02; H04W 4/02; H04W 64/00; H04W 64/03; H04W 64/06
See application file for complete search history.

(56) References Cited

U.S. PATENT DOCUMENTS

| | | | |
|---|---|---|---|
| 6,961,562 B2 | 11/2005 | Ross | |
| 7,046,657 B2 | 5/2006 | Harrington et al. | |
| 7,236,091 B2 | 6/2007 | Kiang et al. | |
| 7,319,878 B2 | 1/2008 | Sheynblat et al. | |
| 7,764,231 B1 | 7/2010 | Karr et al. | |
| 8,098,590 B2 | 1/2012 | Catovic et al. | |
| 8,223,074 B2 | 7/2012 | Alizadeh-Shabdiz | |
| 8,311,018 B2 | 11/2012 | Carlson et al. | |
| 8,391,889 B2 | 3/2013 | Marti et al. | |
| 8,483,719 B2 | 7/2013 | Eitan et al. | |
| 8,600,297 B2 | 12/2013 | Ketchum et al. | |
| 8,903,414 B2 | 12/2014 | Marti et al. | |
| 8,918,103 B2 | 12/2014 | Mayor et al. | |
| 2005/0130672 A1 | 6/2005 | Dean et al. | |
| 2006/0009235 A1 | 1/2006 | Sheynblat et al. | |
| 2006/0025154 A1* | 2/2006 | Alapuranen et al. | ....... 455/456.1 |

(Continued)

FOREIGN PATENT DOCUMENTS

| | | |
|---|---|---|
| JP | 2002077976 | 3/2002 |
| WO | 2012/005469 | 1/2012 |

(Continued)

OTHER PUBLICATIONS

International Search Report and Written Opinion of the International Searching Authority, PCT Application Serial No. PCT/US2014/011832, Jul. 25, 2014, 10 pp.

(Continued)

*Primary Examiner* — Nathan Mitchell
*Assistant Examiner* — Dung Lam
(74) *Attorney, Agent, or Firm* — Fish & Richardson P.C.

(57) ABSTRACT

In some implementations, a method includes receiving, from a server, location data identifying locations of access points and mobile access points. A mobile device may determine an identifier of an access point within a communication range. The identifier is compared with the location data to identify parameters for the access point. The access point is determined to be a mobile access point based on the identified parameters included in the location data. In response to identifying the mobile access point, operating parameters executed by the mobile device are updated.

10 Claims, 5 Drawing Sheets

(56) References Cited

U.S. PATENT DOCUMENTS

| | | |
|---|---|---|
| 2006/0095349 A1 | 5/2006 | Morgan et al. |
| 2007/0002813 A1 | 1/2007 | Tenny et al. |
| 2008/0019317 A1 | 1/2008 | Vellanki et al. |
| 2008/0123608 A1 | 5/2008 | Edge et al. |
| 2008/0227462 A1 | 9/2008 | Freyman et al. |
| 2009/0280829 A1 | 11/2009 | Feuerstein |
| 2009/0298505 A1 | 12/2009 | Drane et al. |
| 2009/0310501 A1 | 12/2009 | Catovic et al. |
| 2010/0056185 A1 | 3/2010 | Lamba |
| 2010/0156706 A1 | 6/2010 | Farmer et al. |
| 2010/0159885 A1 | 6/2010 | Selgert et al. |
| 2010/0159949 A1 | 6/2010 | Selgert et al. |
| 2010/0159958 A1 | 6/2010 | Naguib et al. |
| 2010/0183134 A1 | 7/2010 | Vendrow et al. |
| 2010/0210285 A1 | 8/2010 | Pande et al. |
| 2010/0240339 A1 | 9/2010 | Diamond |
| 2010/0240397 A1 | 9/2010 | Buchmayer et al. |
| 2011/0037571 A1 | 2/2011 | Johnson, Jr. et al. |
| 2011/0065457 A1 | 3/2011 | Moeglein et al. |
| 2011/0124330 A1 | 5/2011 | Kojima |
| 2011/0246148 A1 | 10/2011 | Gupta et al. |
| 2011/0250903 A1 | 10/2011 | Huang et al. |
| 2011/0306360 A1 | 12/2011 | Alizadeh-Shabdiz et al. |
| 2012/0002563 A1 | 1/2012 | Flanagan |
| 2012/0122452 A1 | 5/2012 | Brisebois |
| 2012/0309414 A1 | 12/2012 | Rhoads |
| 2012/0309428 A1 | 12/2012 | Marti et al. |
| 2013/0143597 A1 | 6/2013 | Mitsuya et al. |
| 2013/0178230 A1 | 7/2013 | Marti et al. |
| 2013/0188508 A1 | 7/2013 | Cho et al. |
| 2013/0288709 A1 | 10/2013 | Flanagan |
| 2014/0003327 A1 | 1/2014 | Seo et al. |
| 2014/0036701 A1* | 2/2014 | Gao et al. .................. 370/252 |
| 2014/0057659 A1 | 2/2014 | Udeshi et al. |
| 2014/0171126 A1 | 6/2014 | Mayor et al. |
| 2014/0192781 A1 | 7/2014 | Teyeb et al. |
| 2014/0278220 A1* | 9/2014 | Yuen .......................... 702/150 |
| 2014/0364138 A1 | 12/2014 | Huang et al. |

FOREIGN PATENT DOCUMENTS

| | | |
|---|---|---|
| WO | WO 2012/032725 | 3/2012 |
| WO | WO 2013/025166 | 2/2013 |
| WO | WO 2014/022068 | 2/2014 |
| WO | WO 2014/116494 | 7/2014 |

OTHER PUBLICATIONS

Edge, WO 2007/056738, "Positioning for WLANs and other wireless networks", Aug. 30, 2007.

International Search Report of the International Searching Authority, PCT Application Serial No. PCT/US2014/040079, mailed Dec. 17, 2014, 5 pages.

* cited by examiner

DETECTING MOBILE ACCESS POINTS

TECHNICAL FIELD

This disclosure relates to mobile access points.

BACKGROUND

Mobile devices typically include features for determining a geographic location. For example, a mobile device can include a receiver for receiving signals from a global satellite system (e.g., global positioning system or GPS). The mobile device can determine a geographic location, including latitude and longitude, using the received GPS signals. In many places, GPS signals can be non-existent, weak, or subject to interference, such that it is not possible to determine a location using the GPS functions of a mobile device accurately. In such cases, the mobile device can determine its location using other technologies. For example, if the location of a wireless access gateway (e.g., a cellular tower) is known, and a mobile device can detect the wireless access gateway, the mobile device can then estimate a current location using a location of the detected wireless access gateway. The location of wireless access gateways can be stored in a location database. In some instances, the mobile device may determine the current location using triangulation based on strength of the signals received from the wireless access gateways and their locations.

SUMMARY

In some implementations, a method includes receiving, from a server, location data identifying locations of access points and mobile access points. A mobile device may determine an identifier of an access point within a communication range. The identifier is compared with the location data to identify parameters for the access point. The access point is determined to be a mobile access point based on the identified parameters included in the location data. In response to identifying the mobile access point, operating parameters executed by the mobile device are updated.

The details of one or more implementations are set forth in the accompanying drawings and the description below. Other features, objects, and advantages of the implementations will be apparent from the description and drawings, and from the claims.

DETAILED DESCRIPTION

Exemplary Operating Environment

Figure 1:
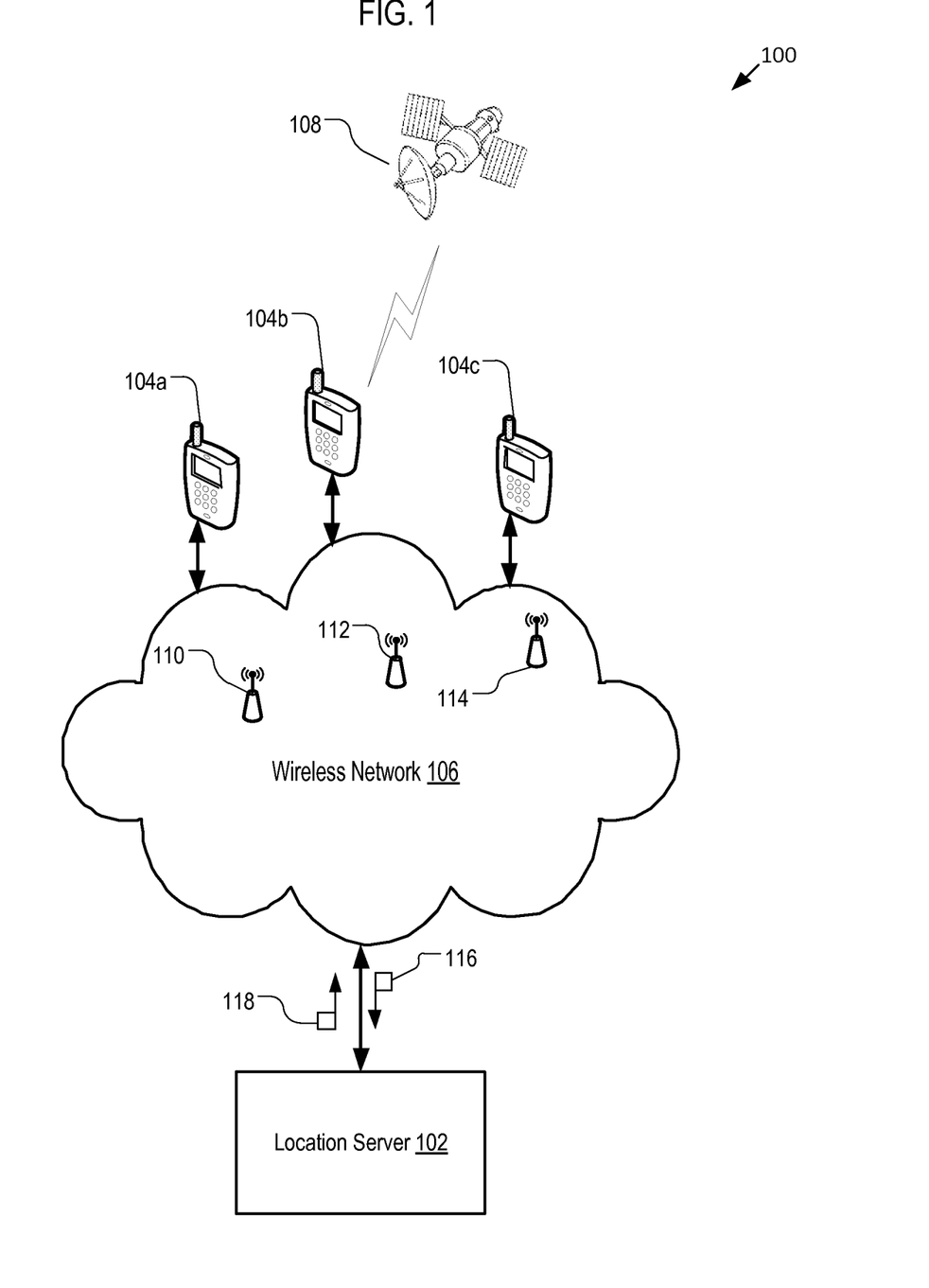
FIG. 1 illustrates an example location system for identifying mobile access points and updating operating parameters of mobile devices.

FIG. 1 is an example location system 100 for identifying mobile access points and updating operations of mobile devices in response to identifying mobile access points. For example, the system 100 may determine an access point is mobile based on crowd sourced data. In some implementations, the system 100 may determine locations of multiple mobile devices interacting with an access point over time and determine distances between the different locations. In these instances, the system 100 may determine the access point is a mobile access point based on the distances and update location data to identify the access point as a mobile access point. The distances between the different locations may be compared with a predefined threshold, and, if one of the distances exceeds the threshold, the access point can be identified as a mobile access point. Location data typically includes identifiers of access points (e.g., Media Access Control (MAC) addresses), access-point locations, timestamps, and information identifying a subset of the access points as mobile access points. In some implementations, the system 100 may periodically determine locations of a mobile device interacting with an access point and associate the mobile-device locations with the access point. Using the mobile-device locations associated with an access point at multiple times, the system 100 may determine whether the access point has moved and is a mobile access point. For example, the system 100 may determine distances between the mobile-device locations associated with the access point and determine whether any of the distances exceeds a predefined threshold. In response to determining an access point is mobile, the system 100 may update location data with information identifying the access point as a mobile access point. In response to identifying a mobile access point, the system 100 may infer that a mobile device interacting with the mobile access point is in a motorized vehicle and update operating parameters for the mobile device accordingly. For example, the updated operating parameters may include at least one of updating a Global Positioning System (GPS) algorithm, a frequency for time zone determinations, or operating modes of the mobile device.

In some implementations, the location system 100 includes one or more computers programmed to determine mobile access points from mobile-device locations and update operating parameters for a mobile device interacting with a mobile access point. As illustrated, the location system 100 includes a location server 102 communicatively coupled to mobile devices 104a-c through a wireless network 106. The wireless network 106 includes access points 110, 112, and 114 configured to wirelessly communicate with the mobile devices 104a-c. The mobile devices 104a-c are configured to determine current locations based on, for example, signals from a satellite 108, triangulating signals from access points 110, 112, and 114, or other techniques. In addition, each of the mobile devices 104a-c is configured to periodically transmit, to the location server 102, a submission 116 identifying current locations and access points 110, 112, 114 within communication range of that mobile device 104. For each mobile device 104, the location server 102 is configured to determine mobile access points based on the mobile-device locations at different times and update location data identifying both access-points locations and mobile access points. Once updated, the location server 102 may transmit location data 118 identifying access-point locations and mobile access points to one or more of the mobile devices 104a-c. Based on the location data 118, the mobile device 104 may update operating parameters in response to identifying a mobile access point within communication range. For example, the mobile device 104 may determine the user occupies a motorized vehicle based on proximity to a mobile access point and update operating parameters in response to the determination.

As for a more detailed description of the system 100, the location server 102 can include any software, hardware, firmware, or combination thereof configured to determine whether an access point is a mobile access point based on locations of a mobile device 104 interacting with the access point at difference times. For example, the location server 102 may determine that the access point 110 is a mobile access point based on a distance between locations of a mobile device 104 over a period of time. In some implementations, the location server 102 receives a submission 116 identifying both locations of a mobile device 104 during a time period (e.g., 24 hours) and access points within communication range at those locations. In response to an event (e.g., receiving the submission 116), the location server 102 may determine a distance between the locations associated with the access point 110, 112, 114 at different times and whether any of the distances exceeds a predefined threshold (e.g., 10 miles, 50 miles, 100 miles). If any of the distances exceed the predefined thresholds, the location server 102 may update location data for the access point 110, 112, 114 to indicate a mobile access point. In some implementations, the location server 102 can aggregate results of processing multiple submissions 116 to raise or lower the confidence that the access point 110, 112, 114 is a mobile access point. In other words, the location server 102 may receive submissions 166 from multiple mobile devices 104 (e.g., five difference submissions) and determine whether the submissions 115 indicate that the access point 110, 112, 114 is a mobile access point. In doing so, the location server 102 may determine or otherwise associate a confidence level to the determination.

In addition, the location server 102 may determine a speed associated with the mobile access point based on the distance and an associated time difference between location determinations. By determining the speed, the location server 102 may determine a type of motorized vehicle (e.g., airplane, boat, train) including the mobile access point and update the location data to identify a vehicle type. To increase confidence level associated with determining a vehicle type, the location server 102 may execute geocoding to determine a textual location of coordinates associated with the mobile device. For example, the location server 102 may determine whether the locations overlap an airport, train station, a boat dock and whether the textual location is associated with the determined vehicle type.

In some implementations, the location server 102 may estimate location areas for the access points 110, 112, and 114 based on the different locations of the mobile devices 104a-c. The location areas indicate communication ranges of access points 110, 112, and 114. To calculate location areas, the location server 102 may apply an iterative process (e.g., by performing a multi-pass analysis). The iterative process may determine a location area (e.g., a circle) that is associated with an access point 110, 112, 114. The location area may have a center that corresponds to an average geographic location based on device locations of the mobile devices 104a-c. For example, the location area may be a circle having a radius that corresponds to an error margin, which can be determined by, for example, the average geographic location and an associated radius. Further details on the iterative process are described below in reference to FIG. 2. The iterative process may be executed periodically (e.g., every six hours) to capture potential movement of access points 110, 112, and 114. The location server 102 may periodically, or in response to an event, transmit to the mobile devices 104a-c the location data 118 identifying access-point locations and mobile access points. An event may include activation of the mobile device 104, registration with an access point 110, 112, 114, or others.

The mobile devices 104a-c can include any software, hardware, firmware, or combination thereof configured to update operating parameters in response identifying mobile access points within communication range. For example, the mobile device 104 may update operating parameters of a GPS module in response to determining the mobile device 104 is travelling or otherwise moving in a motorized vehicle (e.g., airplane). In some implementations, the mobile device 104 may receive, from the location server 102, location data 118 identifying access points 110, 112, and 114 and mobile access points. The mobile device 104 may determine identifiers of access points 110, 112, and 114 within communication range and compare the access-point identifiers to the location data 118. For example, the mobile device 104 may compare MAC addresses of access points 110, 112, and 114 to identifiers of mobile access points included in the location data 118. If the any of the identifiers match identifiers for mobile access points in the location data 118, the mobile device 104 may update one or more operating parameters. For example, the updated operating parameters may include one or more of the following: updating a frequency for executing time zone corrections; switching to or presenting a request to switch to Airplane mode; or updating GPS operations. For example, updates to the GPS operation may include at least one of disregarding land-based user dynamics, increasing a search range, or modifying GPS tracking algorithms for user dynamics. For example, user dynamics can be used to at least one of adjusting tracking-loop dynamics (e.g., measurement engine optimization) or adjusting a positioning engine's kalman filter dynamics model.

Access point 110, 112, 114 can communicate with wireless devices (e.g., mobile devices 104a-c) using various communication protocols. In some implementations, access point 110, 112, 114 can be an access point of a WiFi network, which implements an Institute of Electrical and Electronics Engineers (IEEE) 802.11 based protocol (e.g., IEEE 802.11a). In some implementations, access point 110, 112, 114 can be an access point of a worldwide interoperability for microwave access (WiMAX) network, which implements an IEEE 802.16 based protocol (e.g., IEEE 802.16-2004 or IEEE 802.16e-2005). Access point 110, 112, 114 may have a communication range from less than ten meters to several hundred meters, depending on factors including configuration of access point 110, 112, 114 and physical surroundings. Mobile devices 104a-c can connect to an access point when mobile devices 104a-c are within the communication range of access point 110, 112, 114. In turn, multiple access points 110, 112, 114 can be available to a single mobile device 104. Mobile devices 104a-c may select an access point 110, 112, 114 based on various factors. For example, the selection can be based on whether mobile device 104 is authorized to connect to access point 110, 112, 114 or whether access point 110, 112, 114 can provide the strongest signal for the wireless connection to mobile device 104.

Example Location Server for Identifying Mobile Access Points

Figure 2:
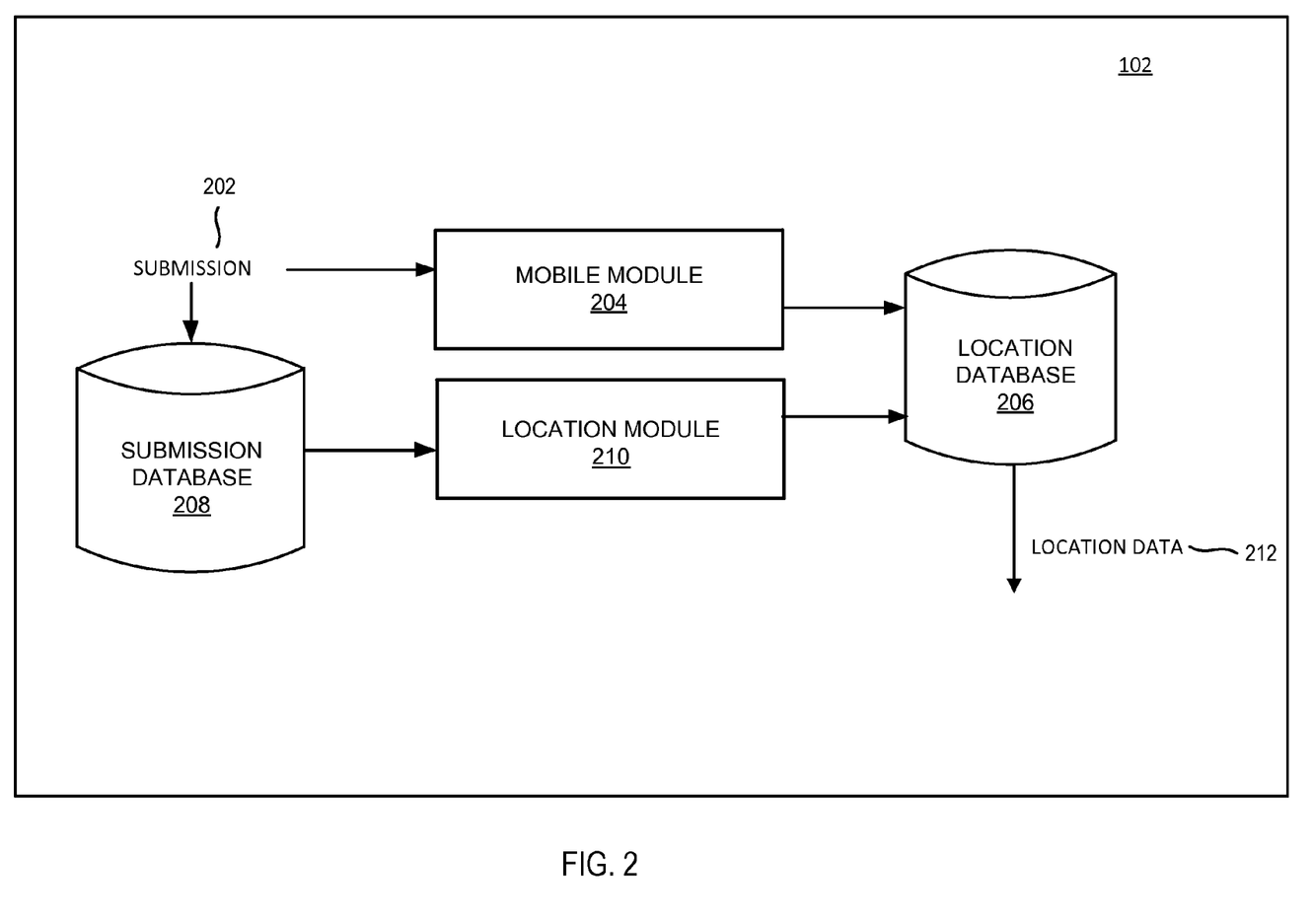
FIG. 2 illustrates an example system for determining mobile access points using crowd sourced data.

FIG. 2 illustrates an example location server 102 of FIG. 1 for identifying mobile access points. For example, the system 200 may determine mobile access points based on differences in locations associated with access points. As illustrated, the location server 102 includes a submission 202 identifying locations of a mobile device and access points identified at those locations, a mobile module 204 for determining mobile access points based on the mobile-device locations identified in the submission 202, a location database 206 for storing information identifying mobile access points and location areas of access points, a submission database 208 for storing submissions from mobile devices, a location module 210 for determining location areas of access points based on the mobile-device locations of multiple mobile devices, and location data 212 for identifying mobile access points and locations of access points to mobile devices. In particular, the submission 202 may be received from a mobile devices 104, as described with respect to FIG. 1, and identify locations over a period of time and access points within communication range at those locations. For example, the submission 202 may include times, device coordinates, identifiers of detected access points (e.g., MAC addresses) as well as other data. Regardless, the submission 202 is passed to the mobile module 204 and the submission database 208.

The mobile module 204 can include any software, hardware, firmware, or combination thereof for determining whether access points are mobile access points based on the locations of a mobile device. In particular, the mobile module 204 may determine whether distances between locations of a mobile device associated with an access point exceed a predetermined threshold. For example, the mobile module 204 may determine distances between locations associated with an access point at different times and whether any of the distances exceeds a predefined threshold. In response to a distance exceeding the threshold, the mobile module 204 may identify the access point as a mobile access point in the location database 206. To increase or decrease a confidence level associated with identifying a mobile access point, the mobile module 204 may execute this determination on submissions from multiple mobile devices. For example, the mobile module 204 may identify locations at different times associated with an access point for multiple mobile devices and, for each mobile device, determine whether the locations at different times indicate a mobile access point. In doing so, the location server 102 may determine or otherwise associate a confidence level to the determination.

In addition, the mobile module 204 may determine a type of motorized vehicle including a mobile access point based on an estimated speed of the mobile access point. For example, the mobile module 204 may estimate the speed of the mobile access point based on the distance between locations and the difference in time for the location determinations. In these instances, the mobile module 204 may compare the speed to different thresholds or ranges to determine a vehicle type (e.g., boat, train, airplane). For example, the mobile module 204 may determine a vehicle type is an airplane if the estimated speed exceeds a threshold such as 300 miles per hour. In some implementations, the mobile module 204 may update the location database 206 with information identifying an access point as a mobile access point and a vehicle type including the mobile access point. In some implementations, the mobile module 204 may execute reverse geocoding to map or otherwise associate access-point coordinates with facilities housing or including the determined vehicle type. For example, the mobile module 204 may determine a type of facility associated with the locations of the mobile device interacting with the access point. The facility types may include an airport, train station, and a boat dock. In doing so, the mobile module 204 may increase or decrease a confidence level for the determined vehicle type.

The location database 206 can include any software, hardware, firmware, or combination thereof to store location data for multiple access points. For example, the location database 206 may store one or more tables mapping or otherwise associating identifiers of access points to information identifying an estimated location and whether the access point is a mobile access point. In some implementations, the location database 206 may store or otherwise identify one or more of the following for each access point: access-point identifier; estimated coordinates and associated radius; time; date; mobile access point indicator; vehicle type; or others. In some implementations, the location database may transmit the location data 212 to one or more mobile devices in response to an event.

As previously mentioned, the submission 202 may be passed to the submission database 208 for storing historical locations for multiple mobile devices within communication range of an access point. In particular, the submission database 208 stores coordinates $(X, Y)_1, (X, Y)_2, \ldots, (X, Y)_n$ for n different mobile devices interacting with an access point. In addition, the stored locations $(X, Y)_1, (X, Y)_2, \ldots, (X, Y)_n$ may be associated with other parameters such as, for example, a time or time period. The times may be used to manage entries in the submission database 208 or used to determine a time period between location determinations associated with the access point.

In response to a trigger event, the location module 210 can include any software, hardware, firmware, or combination thereof configured to execute an algorithm on the locations $(X, Y)_1, (X, Y)_2, \ldots, (X, Y)_n$ for an access point stored in the submission database 208 to determine a location area for an access point. For example, the location module 210 may apply an iterative process by performing a multi-pass analysis to entries in the submission database 208 to determine a location area for an access point including an estimated geometric center (X, Y) and an associated radius R. A trigger event can be any event that triggers a location procedure in the location server 102. For example, the trigger event can be based on time, location, mobile device activity, an application request, received harvest data, expiration of a time period, or other events.

The location module 210 stores the determined location areas in the location database 206. For each location area, the location module 210 may determine a representative location (X, Y) for each access point and an associated radius R. For example, the location module 210 may determine mean coordinates $(X_m, Y_m)$ for each access point as follows:

$$X_m = \frac{\sum_{i=1}^{N} X_i}{N}, \text{ and} \qquad [1]$$

$$Y_m = \frac{\sum_{i=1}^{N} Y_i}{N} \qquad [2]$$

where N is the number of locations for mobile devices interacting with an access point. In other words, the representative location for an access point may be a mean of the device coordinates of mobile devices that interacted with the access point over a period of time. The location module 210 may use other algorithms for determining a representative location center $(X_m, Y_m)$ for an access point without departing from the scope of this disclosure. In addition, the location module 210 may determine a radius R for each representative location. In some implementations, the radius may be based on a percentage (e.g., 80%) of the largest distance between locations associated with the access point, the standard deviation of the magnitudes of the coordinates, or others.

Figure 3:
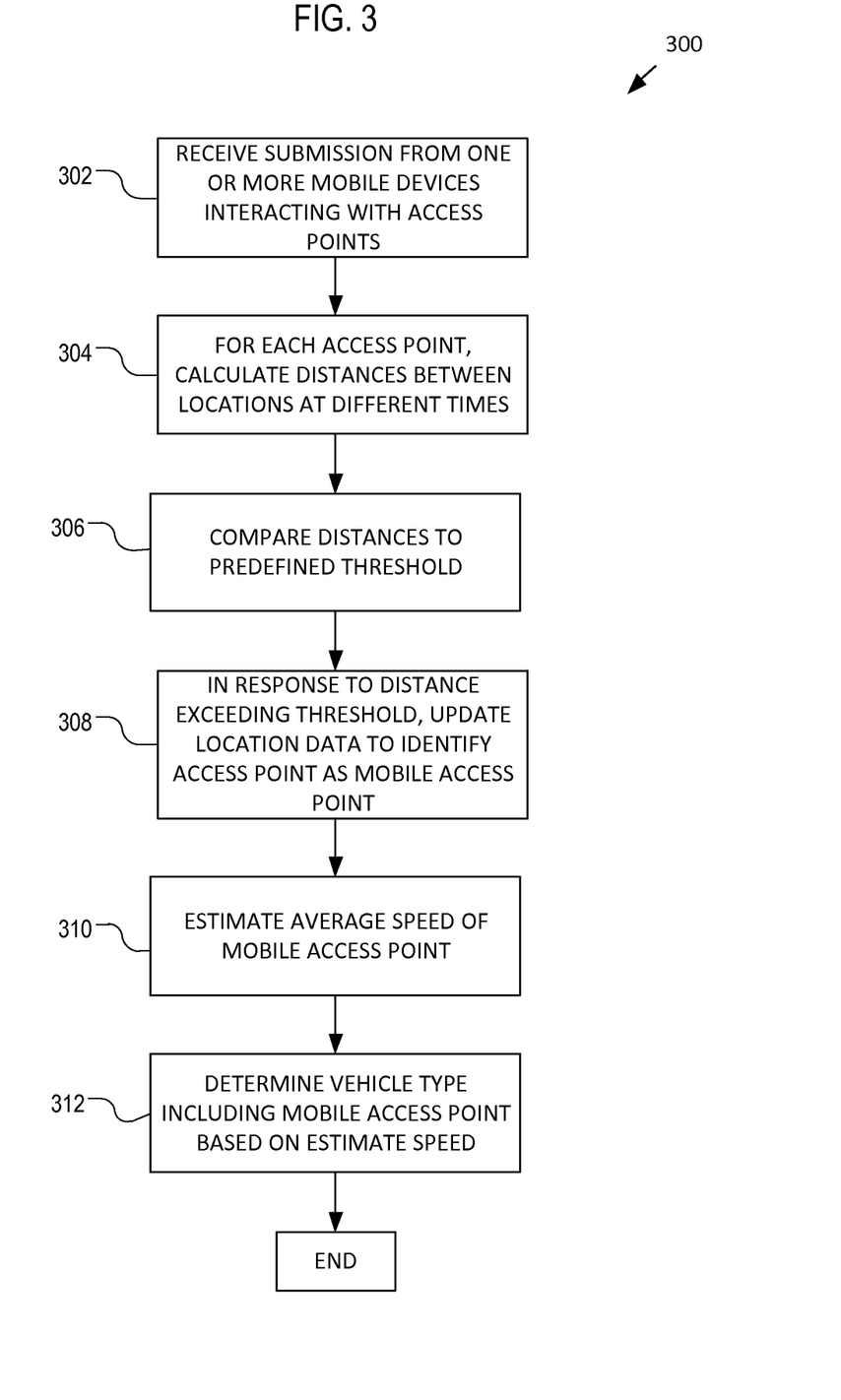
FIG. 3 is a flow chart illustrating an example method for determining mobile access points.
Figure 4:
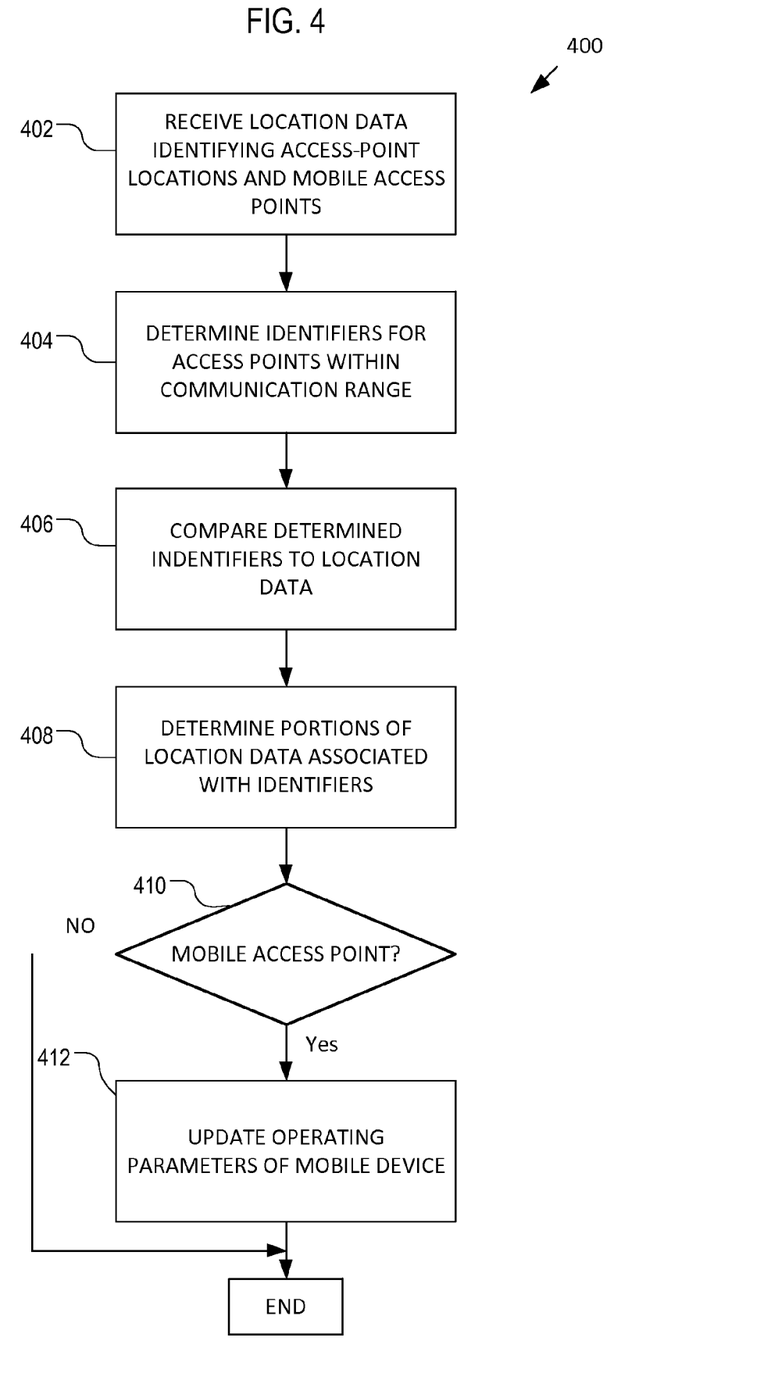
FIG. 4 is a flow chart illustrating an example method for updating operating conditions in response to a mobile access point.

Example Process for Determining Mobile Access Points and Updating Operating Parameters in Response to Mobile Access Points FIGS. 3 and 4 are flow charts illustrating example methods 300 and 400 for identifying mobile access points and updating operating parameters in response to mobile access points. Methods 300 and 400 are described with respect to the system 100 of FIG. 1. Though, the associated system may use or implement any suitable technique for performing these and other tasks. These methods are for illustration purposes only and the described or similar techniques may be performed at any appropriate time, including concurrently, individually, or in combination. In addition, many of the steps in these flowcharts may take place simultaneously and/or in different orders than as shown. Moreover, the associated system may use methods with additional steps, fewer steps, and/or different steps, so long as the methods remain appropriate.

Referring to FIG. 3, method 300 begins at step 302 where a submission is received from a mobile device interacting with access points over a period of time. For example, the location server 102 in FIG. 1 may receive the submission 116 from the mobile device 104 interacting with the access point 110. As previously mentioned, the submission 116 may include or otherwise identify locations at different times and detected or otherwise identified access points at those times. At step 304, differences between locations at different times are calculated for each access point. In the example, the location server 102 may determine that an access point 110, 112, 114 is associated with locations of a mobile device 104 at different times and calculate the distances between the locations. Next, at step 306, the distance between locations at different times is compared to a predefined threshold. In the example, the location server 102 may compare the distance between the different locations for the access point 110 to a predefined threshold. For an access point with a distance exceeding the threshold, the location data is updated to identify the access point as a mobile access point at step 308. As for the example, the location server 102 may update a status of the access point 110 to indicate it as a mobile access point if the distance exceeds the predefined threshold. Next, at step 310, an average speed of the mobile access point is determined. In the example, the location server 102 may divide the distance by the associated time period to estimate an average speed of the access point 110. At step 312, a vehicle type including the mobile access point is determined based on the estimated speed. Again in the example, the location server 102 may compare the average speed of the access point 110 to a speed threshold to determine a vehicle type.

Referring to FIG. 4, method 400 begins at step 402 where location data identifying access-point locations and mobile access points is received. For example, the mobile device 104a may receive, from the location server 102, location data 118 identifying locations of the access points 110, 112, and 114 and whether any of the access points 110, 112, and 114 are mobile access points. At step 404, the identifiers of access points within communication range are determined. In the example, the mobile device 104a may determine identifiers for access points 110, 112, and 114 within communication range. Next, at step 406, the access-point identifiers are compared with the location data. Again in the example, the mobile device 104a may compare the MAC addresses of the access points 110, 112, and 114 to the location data 118. At step 408, portions of the location data are mapped to or otherwise associated with the access-point identifiers. In the example, the mobile device 104a may determine parameters in the location data 118 that map to or are otherwise associated with the access points 110, 112, and 114. If the access point is not a mobile access point at decisional step 410, then execution ends. If the access point is a mobile access point, then, at step 412, operating conditions of the mobile device is updated. As for the example, the mobile device 104a may determine that the access point 110 is a mobile access point based on the location data and update operating parameters of at least one of a GPS algorithm, time zone activity, operating mode, or other operations.

Example Mobile Device Architecture

Figure 5:
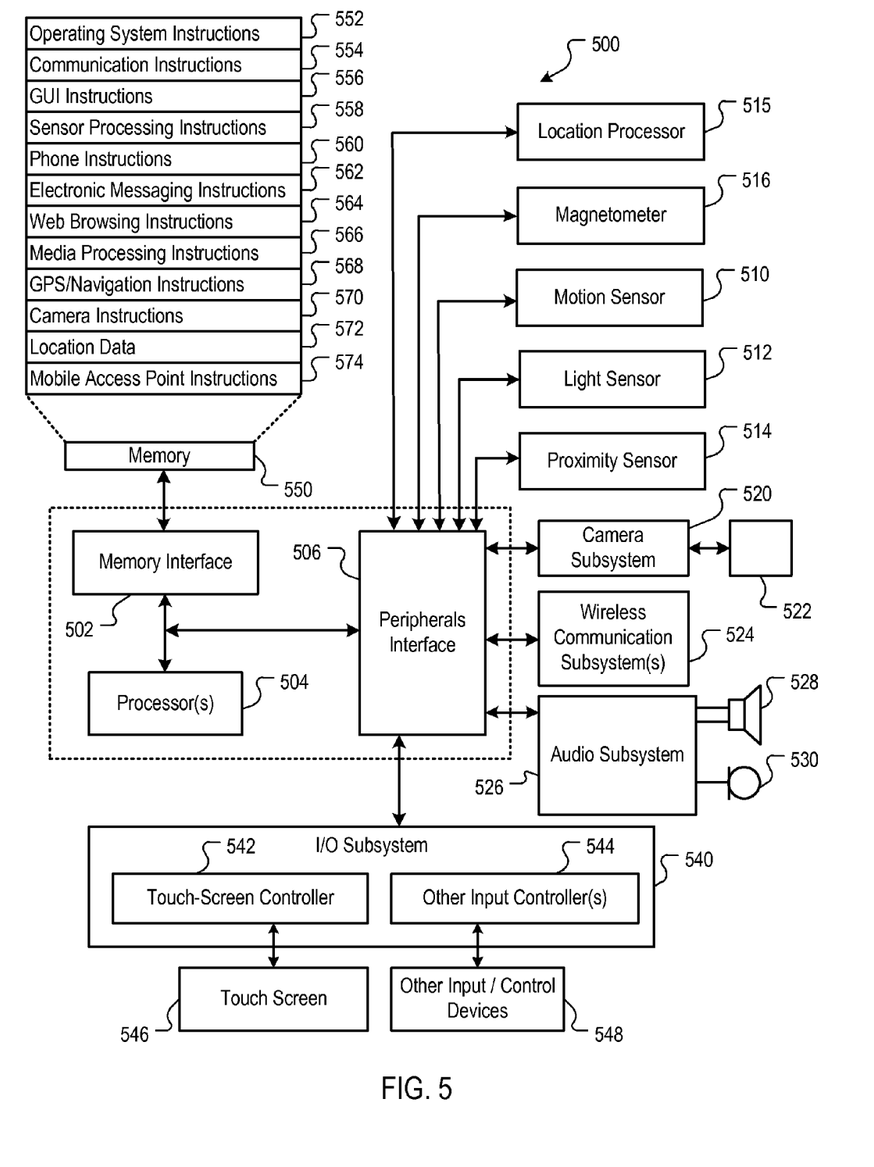
FIG. 5 is a block diagram illustrating exemplary device architecture of a mobile device implementing the features and operations described in reference to FIGS. 1-4.

FIG. 5 is a block diagram of exemplary architecture 500 of a mobile device including an electronic magnetometer. The mobile device 500 can include memory interface 502, one or more data processors, image processors and/or central processing units 504, and peripherals interface 506. Memory interface 502, one or more processors 504 and/or peripherals interface 506 can be separate components or can be integrated in one or more integrated circuits. Various components in mobile device architecture 500 can be coupled together by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the mobile device. Location processor 515 (e.g., GPS receiver) can be connected to peripherals interface 506 to provide geopositioning. Electronic magnetometer 516 (e.g., an integrated circuit chip) can also be connected to peripherals interface 506 to provide data that can be used to determine the direction of magnetic North.

Camera subsystem 520 and Optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of communication subsystem 524 can depend on the communication network(s) over which the mobile device is intended to operate. For example, the mobile device may include communication subsystems 524 designed to operate over a GSM network, a GPRS network, an EDGE network, a Wi-Fi or WiMax network, and a Bluetooth™ network. In particular, wireless communication subsystems 524 may include hosting protocols such that the mobile device may be configured as a base station for other wireless devices.

Audio subsystem 526 can be coupled to speaker 528 and microphone 530 to facilitate voice-enabled functions, such as voice recognition, voice replication, digital recording, and telephony functions. Note that speaker 528 could introduce magnetic interference to the magnetometer, as described in reference to FIGS. 1-2.

I/O subsystem 540 can include touch-screen controller 542 and/or other input controller(s) 544. Touch-screen controller 542 can be coupled to touch screen 546. Touch screen 546 and touch-screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 546.

Other input controller(s) 544 can be coupled to other input/control devices 548, such as one or more buttons, rocker switches, thumb-wheel, infrared port, USB port, docking station and/or a pointer device such as a stylus. The one or more buttons (not shown) can include an up/down button for volume control of speaker 528 and/or microphone 530.

In one implementation, a pressing of the button for a first duration may disengage a lock of touch screen 546; and a pressing of the button for a second duration that is longer than the first duration may turn power to the mobile device on or off. The user may be able to customize a functionality of one or more of the buttons. Touch screen 546 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod Touch®.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store operating system instructions 552, such as Darwin, RTXC, LINUX, UNIX, OS X, WINDOWS, or an embedded operating system such as VxWorks. Operating system instructions 552 may include instructions for handling basic system services and for performing hardware dependent tasks. In some implementations, operating system instructions 552 can be a kernel (e.g., UNIX kernel).

Memory 550 may also store communication instructions 554 to facilitate communicating with one or more additional devices, one or more computers and/or one or more servers. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; camera instructions 570 to facilitate camera-related processes and functions; location data 572 and mobile access point instructions 574 to facilitate updating operating parameters in response to mobile access points, as described in reference to FIG. 1-4. In some implementations, GUI instructions 556 and/or media processing instructions 566 implement the features and operations described in reference to FIGS. 1-4.

Memory 550 may also store other software instructions (not shown), such as web video instructions to facilitate web video-related processes and functions; and/or web shopping instructions to facilitate web shopping-related processes and functions. In some implementations, media processing instructions 566 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 550.

Each of the above-identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application-specific integrated circuits.

The disclosed and other implementations and the functional operations described in this specification can be implemented in digital electronic circuitry, or in computer software, firmware, or hardware, including the structures disclosed in this specification and their structural equivalents, or in combinations of one or more of them. The disclosed and other implementations can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more them. The term "data processing apparatus" means all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed implementations can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed implementations can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what is being claimed or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations of the disclosure have been described. Nevertheless, it will be understood that various modifications may be made without departing from the spirit and scope of the disclosure. Accordingly, other implementations are within the scope of the following claims.

A number of implementations of the implementation have been described. Nevertheless, it will be understood that various modifications may be made without departing from the spirit and scope of the implementation. Accordingly, other implementations are within the scope of the following claims.

What is claimed is:

1. A method, comprising:
   receiving, from a mobile device at different times, data associated with a plurality of different locations of the mobile device during interaction of the mobile device with an access point at the different times;
   determining, based on the data associated with each of the plurality of different locations, a distance between the plurality of different locations at which the mobile devices interacted with the access point at the different times;
   comparing each of the determined distances with a predefined distance threshold;
   determining, in response to the comparing, the access point is a mobile access point based on one of the determined distances exceeding the predefined distance threshold; and
   transmitting, to other mobile devices, location data identifying a location of the access point that has been determined to be a mobile access point.

2. The method of claim 1, updating, at a server, a location database identifying the access point as being the mobile access point.

3. The method of claim 1, further comprising:
   estimating an average speed of the access point based on a particular one of the determined distances and an associate time difference between locations used to determine the particular one of the determined distances; and
   comparing the estimated average speed with a predefined average speed threshold,
   determining, based upon the comparing the estimated average speed with a predefined average speed threshold, a vehicle type based on the average speed exceeding a predefined average speed threshold.

4. The method of claim 3, wherein the vehicle type comprises an airplane.

5. The method of claim 3, further comprising:
   determining, based on the data associated with the plurality of different locations of the mobile device during the interaction of the mobile device, a type of facility; and
   determining, in response to the determining a type of facility, whether the determined vehicle type matches the determined facility type.

6. The method of claim 1, further comprising:
   determining, for each of a plurality of mobile devices, distances between other locations at the different times associated with the access point; and
   determining, for each of the plurality of the mobile devices, whether any of the distances exceed the predefined distance threshold.

7. A computer program product encoded on non-transitory medium, the product comprising computer readable instructions for causing one or more processors to perform operations comprising:

receiving, from a mobile device at different times, data associated with a plurality of different locations of the mobile device during interaction of the mobile device with an access point at the different times;

determining, based on the data associated with each of the plurality of different locations, a distance between the plurality of different locations at which the mobile devices interacted with the access point at the different times;

comparing each of the determined distances with a predefined distance threshold;

determining, in response to the comparing, the access point is a mobile access point based on one of the determined distances exceed the predefined distance threshold; and transmitting, to other mobile devices, location data identifying a location of the access point that has been determined to be a mobile access point.

8. The computer program product of claim 7, the instructions further comprising:

estimating an average speed of the access point based on a particular one of the determined distances and an associate time difference between locations used to determine the particular one of the determined distances; and comparing the estimated average speed with a predefined average speed threshold, determining, based upon the comparing the estimated predefined average speed with a predefined average speed threshold, a vehicle type based on the average speed exceeding a predefined average speed threshold.

9. The computer program product of claim 8, the instructions further comprising:

determining, based on the data associated with the plurality of different locations of the mobile device during the interaction of the mobile device, a type of facility; and determining, in response to the determining a type of facility, whether the determined vehicle type matches the determined facility type.

10. The computer program product of claim 7, the instructions further comprising:

determining, for each of a plurality of mobile devices, distances between other locations at the different times associated with the access point; and determining, for each of the plurality of the mobile devices, whether any of the distances exceed the predefined distance threshold.

* * * * *